Dec. 13, 1927.
S. SCHREIBER
1,652,585
CONDIMENT CONTAINER
Filed July 2, 1925
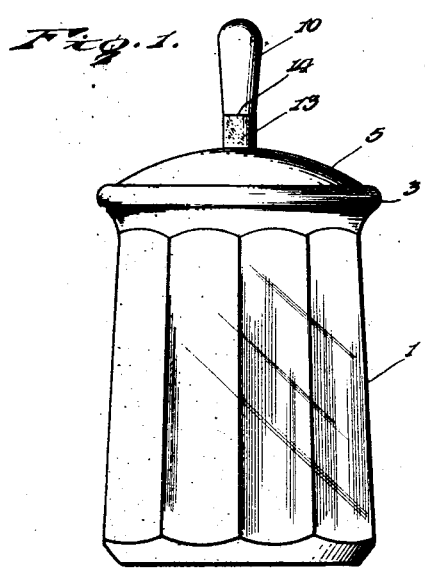
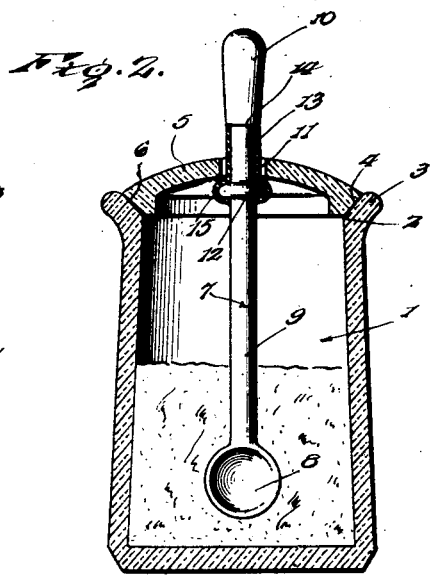
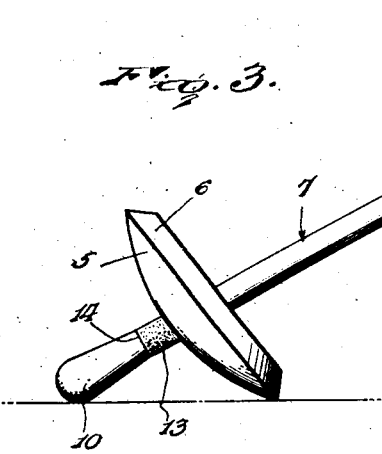
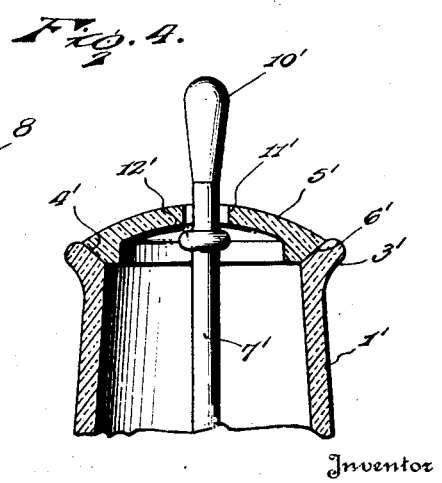
Inventor
Sigmond Schreiber.
By Lacey & Lacey, Attorneys Patented Dec. 13, 1927.

1,652,585

UNITED STATES PATENT OFFICE.

SIGMOND SCHREIBER, OF PITTSBURGH, PENNSYLVANIA.

CONDIMENT CONTAINER.

Application filed July 2, 1925. Serial No. 41,204.

This invention relates to condiment containers and more particularly to an improvement in mustard jars such as are employed upon the tables and counters of hotel dining rooms, cafes, lunch rooms, cafeterias, and other eating places. Ordinarily, such a jar is provided with a lid having a notch in its periphery and a spoon or ladle is disposed within the jar with its handle portion engaging in the notch. In the use of such a jar, however, it is necessary to remove the lid in order to utilize the spoon or ladle and a careless or indifferent customer will not infrequently place the lid upon the table cloth or other surface upon which the jar is disposed and will sometimes even place the spoon or ladle thereon. Such a practice, of course, results in an insanitary condition as well as laundry bills through the soiling of the table linen, and likewise results in an untidy appearance of the table. In some instances, mustard jars are not provided with lids but are merely left open so that the spoon or ladle may be freely introduced and removed, but in such a case the condiment soon becomes too dry for use, and, furthermore, it is liable to become contaminated. In view of the disadvantages presented by devices of this class, the present invention has as its general object to provide a mustard jar embodying a lid and a spoon or ladle so constructed and assembled that, in the use of the spoon, it will be necessary to remove the lid from the jar at the time the spoon is removed to remove a desired quantity of mustard from the jar, it being likewise necessary to replace the lid in position upon the mouth of the jar in order to again introduce the spoon into the jar, so that a more sanitary condition will attend the use of the jar and the mustard will likewise be kept in better condition for use and will not be subject to deterioration as in the instance of previously employed jars of this type.

Condiment containers or jars of the class referred to are usually made of glass or other vitreous material as are also the spoons employed in connection with the same, and the spoons are, therefore, more or less fragile and readily broken. Therefore, the invention has as a further object to provide means whereby the contact of the spoon with the lid of the jar will be cushioned in such a manner as to absorb any impacts of one part with another which would tend to cause breakage of the handle of the spoon.

Another object of the invention is to so construct and so assemble the lid and spoon that if one should be inclined to lay the same upon the table or other surface upon which the jar is disposed, the tendency will be to so dispose the lid and spoon that the bowl of the spoon will be supported in an elevated position with the upper end of the handle of the spoon and the upper side of the lid, at the periphery of the latter, resting upon such surface, so that no portions of these parts which might have mustard thereon, will be brought into contact with the surface to soil the same.

In the accompanying drawings:

Figure 1 is a view in elevation of a mustard jar embodying the present invention.

Figure 2 is a vertical diametric sectional view through the jar, the lid being in closed position.

Figure 3 is a view in side elevation illustrating the lid and spoon of the device removed from the body of the jar, and disposed upon a surface.

Figure 4 is a fragmentary view similar to Figure 2, illustrating a slight modification of the invention.

The article embodying the invention comprises a jar which is indicated in general by the numeral 1 and which may be of any desired contour and size and ornamented in any desired manner. Likewise, the jar may be of any material found suitable for the purpose. The jar is provided, as usual, with a mouth 2 which is formed with an outwardly flared rim portion 3 having a smooth conical beveled seating surface 4. The lid of the jar is indicated by the numeral 5 and the same may likewise be of any desired contour and of any desired material found suitable for the purpose, and the said lid 5 is provided with a beveled peripheral seating surface 6 designed to snugly contact the surface 4 and thus provide for centering of the lid in the mouth of the jar, when the lid is disposed in position closing the said mouth, and at the same time forming a more or less air-tight fit between the parts.

The spoon or ladle of the container, in the embodiment illustrated more particularly in Figures 1, 2 and 3 of the drawings, is indicated in general by the numeral 7 and the same comprises a bowl 8, a shank 9, and a handle 10. The spoon or ladle may be formed of glass or any other material found suitable for the purpose and may be of any desired contour, and the upper end of the shank portion 9 of the spoon is freely received in a circular opening 11 formed axially in the lid 5. At a point suitably spaced below the handle portion 10, the shank 9 of the spoon or ladle is formed with a circumferential abutment rib 12 which is preferably rounded on a vertical line of cross section and is of a diameter greater than the diameter of the opening 11, the handle portion 10 being, however, of a maximum diameter slightly less than that of the said opening so that the spoon may be assembled with the lid 5 by inserting the handle portion 10 upwardly through the opening 11 and, at the same time, when the handle portion is grasped in the act of removing the spoon from the jar, the abutment rib 12, being of greater diameter than the opening 11, will prevent or limit upward movement of the spoon shank through the said opening 11 so that the lid 5 will be removed at the time of removal of the spoon. In order to prevent fracture of the spoon handle or shank, the same being made of glass or other more or less fragile material, through impactive contact with the wall of the opening 11 in the said lid, a sheath 13 of soft rubber, cork, or any other cushioning material found suitable for the purpose, is fitted onto the upper portion of the shank 9 and surrounds that portion of the shank which is normally located within the opening 11. The lower end of the handle portion 10 is preferably of slightly greater diameter than the shank 9 of the spoon at the juncture of these parts so that a shoulder 14 is formed surrounding the shank at the lower end of the said handle 10, and, by reference to Figure 2 of the drawings, it will be noted that the upper end of the sheath 13 engages against said shoulder. The lower portion of the sheath is formed with a circumferential bulge 15 which encompasses and covers the abutment rib 12. At this point, it will be evident that there can be no direct contact between the handle or shank of the spoon and the wall of the opening 11 in the lid 5, nor can the rib 12 come into direct contact with the said lid, so that liability of fracture of the handle or shank of the spoon is reduced to a minimum.

From the foregoing description of the invention, it will be evident that when the handle of the spoon is grasped for the purpose of removing a quantity of mustard from the jar, the lid 5 will be removed with the spoon and, naturally, the lid will be replaced in position closing the mouth of the jar when the spoon is returned to the jar. In view of the fact that the lid is removed with the spoon, there is little tendency on the part of anyone to place the assemblage upon the surface upon which the jar is supported, but should there be such a tendency on the part of the user, the assemblage would naturally be disposed in the position illustrated in Figure 3 of the drawings, so that the bowl of the spoon would be supported in an elevated position and only the upper side of the periphery of the lid would rest in engagement with said surface, thus preventing the mustard being smeared or dropped upon the surface.

In the form of the invention illustrated in Figure 4 of the drawings, the construction is identical with that illustrated in the previously described embodiment with the exception that the cushioning sheath is omitted, and in this figure, parts corresponding to those illustrated in the other figures, and more especially Figure 2, are indicated by corresponding reference numerals, primed.

Having thus described the invention, what I claim is:

1. A condiment holder comprising a container having a mouth, a lid fitting and closing said mouth and provided with an opening, a condiment removing member including a shank having a condiment collecting member at one end and a handle at the other end, the said handle being smaller in diameter than said opening whereby to be insertable through the opening and the said shank being receivable within the opening, an abutment upon the shank below the handle thereof and of dimensions greater than that of the opening, the abutment being located below the under side of the lid, and a cushioning sheath upon that portion of the shank of the condiment collecting member which is receivable within the said opening in the lid and including a portion covering the abutment and, by its engagement therewith, being held against longitudinal displacement upon the shank.

2. A condiment holder comprising a container having a mouth, a lid fitting and closing said mouth and provided with an opening, and a condiment removing member including a shank having a condiment collecting member at one end and a handle at the other end, the said handle being smaller in diameter than the said opening whereby to be insertable through the opening and the said shank being receivable within the opening, an abutment upon the shank below the handle thereof and of dimensions greater than that of the opening, the abutment being located below the under side of the lid and constituting a circumscribing rib upon the said shank of the condiment collecting member, the condiment removing member being provided with a circumscribing shoulder at the juncture of its shank and handle, and a cushioning sheath fitting the said shank and abutting at its upper end against the shoulder, and, at its lower portion, engaging the abutment rib whereby to be held against longitudinal displacement upon the shank.

In testimony whereof I affix my signature.

SIGMOND SCHREIBER. [L. S.]